June 28, 1932. V. A. RADOMSKI 1,865,387

AUTOMATIC SHUT-OFF FOR TANKS

Filed March 30, 1931

V. A. Radomski, INVENTOR

BY Victor J. Evans and Co.

ATTORNEYS

Patented June 28, 1932

1,865,387

UNITED STATES PATENT OFFICE

VALERIAN A. RADOMSKI, OF REFUGIO, TEXAS

AUTOMATIC SHUT-OFF FOR TANKS

Application filed March 30, 1931. Serial No. 526,420.

Tanks containing liquids, such as crude oil, gasoline, fuel oil, water, etc., are generally arranged at different heights, that one tank may be say five feet above the level of the pump that draws the liquid from the tank and another may be positioned a distance say five feet below the level of the pump.

This varying height of tanks with respect to the pumps varies all along the line, so that when liquid is drawn by the pump from the tanks at the higher elevations air will be drawn into the line unless the valve in the line, adjacent to the tank is shut off. It is, therefore, the object of this invention to provide an automatic cut-off for storage tanks operable to close the tank after the fluid has been pumped therefrom.

A further object is the provision of an automatic shut-off for this purpose which is characterized by simplicity in construction and reliability and efficiency in practical use.

To the attainment of the foregoing the invention consists in the improvement hereinafter described and definitely claimed.

Figure 1:
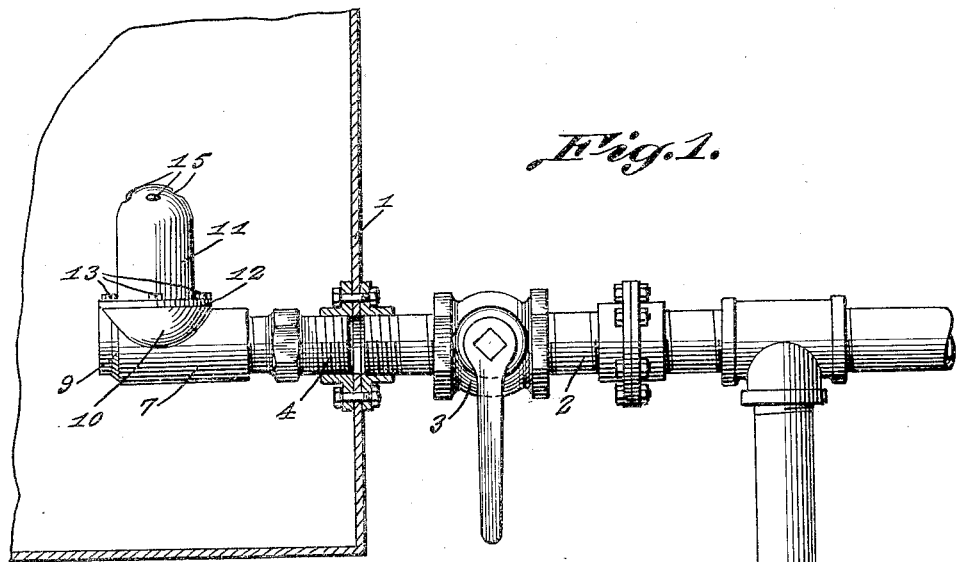
Figure 1 is a side elevation of the improvement arranged in a tank and attached to the pump line.
Figure 2:
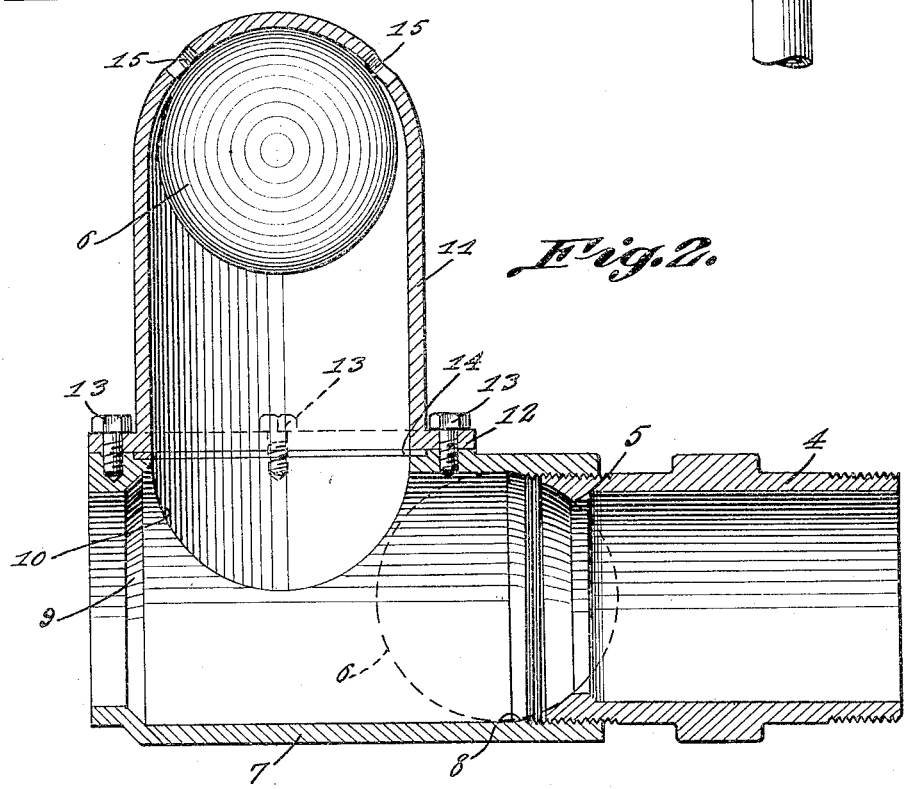
Figure 2 is an enlarged central longitudinal sectional view through the improvement.

In the drawing I have illustrated my improvement in connection with a single fluid containing tank. It is, however, to be understood that all of the tanks which are connected to a single line and in which a pump is employed for drawing the fluid from the tanks are equipped with the improvement. The tanks, it should be stated, are arranged at different elevations with respect to each other and with respect to the pump, and consequently when the liquid is drawn from the elevated tanks the pump will suck air into the line from such tank or tanks, unless an attendant is positioned at each tank to shut off the hand operated valve in the line for such tank.

The tank is indicated by the numeral 1 and the pipe line which enters adjacent to the bottom of the tank by the numeral 2. The pipe line 2 is connected to the pump (not shown) and has branches that lead to other tanks which, as stated, are at different elevations with respect to each other and with respect to the pump. The pipe line 2, adjacent to the tank 1, is provided with hand operated valve 3 which is employed for closing the line after the tank has been emptied.

In carrying out my invention I screw in the threaded boss in which the end of the line 2 is also screwed a short pipe 4. The pipe is located in the tank and has its inner end flared inwardly to provide a seat 5 for a float ball valve 6. The pipe 4 has screwed on its inner end a short pipe or tube 7 whose inner walls, adjacent to the ends thereof, are thickened and are flared or tapered, as at 8 and 9, respectively, the tapered wall 8 being located opposite the valve seat 5. The tubular member 7 has its top provided with a round opening, the body of the tube being widened and rounded upwardly, as at 10. Around such opening and arranged over the said opening there is the open bottom of a dome-shaped cage 11. The cage has its bottom provided with an annular flange 12 that rests directly upon the top of the tube 7 and is fixed thereon by bolts 13. The bolts compress between the flange 12 and the top of the tube a gasket 14.

The rounded top of the cage 11 is provided with any desired number of spaced apertures or openings 15.

The float valve 6 is retained against the top of the cage 11 as long as there is sufficient liquid in the tank to buoy the same to such position. As the liquid is drawn out of the tank by the pump the valve float sinks in the cage in accordance with the level of the liquid. When the liquid in the tank sinks to permit of the valve 6 moving out of the cage 11 and into the tube 7 the suction created by the pump will cause the valve to occupy the seat 5 and thereby automatically shut off the tank to the line so that the pump cannot suck air from the tank into the line.

The construction and advantages of my improvement will, it is thought, be understood and appreciated by those skilled in the art to which such invention relates and while I have illustrated a satisfactory embodiment of my improved device my features of invention are capable of extended application and I do not wish to be restricted to the precise details herein set forth.

Having described the invention, I claim:

An automatic shut off for tanks which are arranged at different elevations and connected to a pipe line provided with a pump for drawing the liquid from the tanks, comprising a short pipe screwed in the tank in a line with the pipe line, and having its inner end flared to provide a valve seat, a tubular member screwed on the short pipe and having its ends thickened and tapered inwardly, said tube having an open top, a dome-shaped cage secured to the tube and closing the top, said cage having apertures at the top thereof and a spherical float valve buoyed into the cage by the liquid in the tank and movable downwardly from the cage into the tube and against the seat when the liquid is drawn from the tank.

In testimony whereof I affix my signature.

VALERIAN A. RADOMSKI.